United States Patent
Suh et al.

(10) Patent No.: US 11,494,228 B2
(45) Date of Patent: Nov. 8, 2022

(54) CALCULATOR AND JOB SCHEDULING BETWEEN JOBS WITHIN A JOB SWITCHING GROUP

(71) Applicant: SAMSUNG SDS CO., LTD., Seoul (KR)

(72) Inventors: Man Suk Suh, Seoul (KR); Hwan Kyun Roh, Seoul (KR); Gi Beom Pang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 452 days.

(21) Appl. No.: 16/664,369

(22) Filed: Oct. 25, 2019

(65) Prior Publication Data
US 2020/0133722 A1    Apr. 30, 2020

(30) Foreign Application Priority Data

Oct. 26, 2018  (KR) .......................... 10-2018-0128665

(51) Int. Cl.
    *G06F 9/48* (2006.01)
    *G06T 1/20* (2006.01)
    *G06F 9/50* (2006.01)

(52) U.S. Cl.
    CPC .......... *G06F 9/4881* (2013.01); *G06F 9/5038* (2013.01); *G06T 1/20* (2013.01)

(58) Field of Classification Search
    CPC ...... G06F 9/4881; G06F 9/5038; G06F 9/505; G06F 9/5027; G06T 1/20
    See application file for complete search history.

(56) References Cited

U.S. PATENT DOCUMENTS

| | | | |
|---|---|---|---|
| 6,195,674 B1* | 2/2001 | Elbourne | G06F 17/147 708/401 |
| 2014/0298060 A1* | 10/2014 | Hooker | G06F 1/3293 713/323 |
| 2015/0019737 A1* | 1/2015 | Kim | G06F 9/5061 709/226 |
| 2015/0113542 A1* | 4/2015 | Cadambi | H04L 67/1023 718/107 |
| 2015/0178879 A1* | 6/2015 | Palmer | G06T 1/20 345/506 |
| 2016/0246647 A1 | 8/2016 | Harris et al. | |
| 2017/0031829 A1 | 2/2017 | Wokhlu et al. | |
| 2017/0185448 A1* | 6/2017 | Tao | H04L 67/327 |
| 2018/0088989 A1 | 3/2018 | Nield et al. | |
| 2020/0073714 A1* | 3/2020 | Venkataraman | G06F 9/4887 |

OTHER PUBLICATIONS

Office action dated Aug. 22, 2022 from Korean Patent Office in a counterpart Korean Patent Application No. 10-2018-0128665.

* cited by examiner

*Primary Examiner* — Jorge A Chu Joy-Davila
(74) *Attorney, Agent, or Firm* — The PL Law Group, PLLC

(57) ABSTRACT

A method for scheduling jobs for the calculator includes measuring core utilization of the second-type processor, when the measured core utilization is less than a reference value, transmitting, by the first-type processor, a job suspension instruction to suspend a first job, which is currently being executed, to the second-type processor, in response to the job suspension instruction, copying data of a region occupied by the first job in a memory of the second-type processor to a main memory, copying data of a second job stored in the main memory to the memory of the second-type processor, and transmitting, by the first-type processor, an instruction to execute the second job to the second-type processor.

18 Claims, 13 Drawing Sheets

| | JOB | STATE | GPU MEMORY REQUIREMENT (GIGA) | JOB SWITCHING GROUP | STABLIZATION | GPU ID | GPU CORE UTILIZATION | CORRESPODING VM | PRIORITY (IN ORDER OF A, B, AND C) |
|---|---|---|---|---|---|---|---|---|---|
| | J#1 | COMPLETE | 1.8 | Under 2G | YES | | | VM#1 | A |
| | J#2 | EXECUTING CPU | 5.7 | Under 6G | YES | | | VM#1 | A |
| | J#3 | WAITING FOR GPU | 15.2 | Under 16G | YES | | | VM#2 | B |
| | J#4 | WAITING FOR GPU | 1.6 | Under 2G | YES | | | VM#2 | B |
| | J#5 | WAITING FOR GPU | 5.8 | Under 6G | NO | | | VM#1 | A |
| | J#6 | WAITING FOR GPU | 5.4 | Under 6G | YES | | | VM#1 | A |
| | J#7 | WAITING FOR GPU | 5.5 | Under 6G | YES | | | VM#2 | B |
| CANDIDATE JOBS FOR PROCESSOR SWITCHING (GPU to CPU) | J#8 | USING GPU | 5.6 | Under 6G | NO | G#41 | 21% | VM#2 | B |
| | J#9 | USING GPU | 5.2 | Under 6G | YES | G#41 | 21% | VM#1 | A |
| | J#10 | EXECUTING CPU | – | – | NO | | | VM#1 | A |
| | J#11 | EXECUTING CPU | – | – | NO | | | VM#1 | A |
| | J#12 | EXECUTING CPU | – | – | NO | | | VM#2 | B |
| | J#13 | USING GPU | 5.3 | Under 6G | NO | G#42 | 89% | VM#3 | C |
| | J#14 | USING GPU | 5.1 | Under 6G | NO | G#42 | 89% | VM#4 | C |

| JOB | STATE | GPU MEMORY REQUIREMENT (GIGA) | JOB SWITCHING GROUP | STABLIZATION | GPU ID | GPU CORE UTILIZATION | CORRESPODING VM | PRIORITY (IN ORDER OF A, B, AND C) |
|---|---|---|---|---|---|---|---|---|
| J#1 | COMPLETE | 1.8 | Under 2G | YES | | | VM#1 | A |
| J#2 | EXECUTING CPU | 5.7 | Under 6G | YES | | | VM#1 | A |
| J#3 | WAITING FOR GPU | 15.2 | Under 16G | YES | | | VM#2 | B |
| J#4 | WAITING FOR GPU | 1.6 | Under 2G | YES | | | VM#2 | B |
| J#5 | WAITING FOR GPU | 5.8 | Under 6G | NO | | | VM#1 | A |
| J#6 | WAITING FOR GPU | 5.4 | Under 6G | YES | | | VM#1 | A |
| J#7 | WAITING FOR GPU | 5.5 | Under 6G | YES | | | VM#2 | B |
| J#8 | USING GPU | 5.6 | Under 6G | NO | G#41 | 21% | VM#2 | B |
| J#9 | USING GPU | 5.2 | Under 6G | YES | G#41 | 21% | VM#1 | A |
| J#10 | EXECUTING CPU | — | — | NO | | | VM#1 | A |
| J#11 | EXECUTING CPU | — | — | NO | | | VM#1 | A |
| J#12 | EXECUTING CPU | — | — | NO | | | VM#2 | B |
| J#13 | USING GPU | 5.3 | Under 6G | NO | G#42 | 89% | VM#3 | C |
| J#14 | USING GPU | 5.1 | Under 6G | NO | G#42 | 89% | VM#4 | C |

CANDIDATE JOBS FOR PROCESSOR SWITCHING (GPU to CPU): J#8, J#9

FIG. 9B

CALCULATOR AND JOB SCHEDULING BETWEEN JOBS WITHIN A JOB SWITCHING GROUP

CROSS-REFERENCE TO RELATED APPLICATION

This application claims priority from Korean Patent Application No. 10-2018-0128665 filed on Oct. 26, 2018 in the Korean Intellectual Property Office, the disclosure of which is incorporated herein by reference in its entirety.

BACKGROUND

1. Field of the Disclosure

The present disclosure relates to a calculator and a job scheduling method thereof and more particularly, to a calculator whose job scheduling method is improved to increase the utilization of a second-type processor in a computing system including a first-type processor serving as a main processor and the second-type processor having an improved capability in specialized calculation and the job scheduling method.

2. Description of the Related Art

There are dedicated processors for efficiently processing calculation of jobs which are executed through multithreading. A graphics processing unit (GPU) is an example thereof. The GPU is a processor specialized for graphics calculations and is able to efficiently process multithreaded calculations because multiple cores are integrated therein. The GPU is not only used in graphics calculations but also is widely used in processing general multithreaded calculations. Also, there are products which represent that it is a general-purpose graphics processing unit (GPGPU) in order to emphasize that such a capability in general multithreaded calculations has been improved. The GPU or GPGPU has a dedicated memory therein. Calculations of job codes loaded into the dedicated memory are performed in parallel through the multiple cores.

If no more job codes can be loaded into the dedicated memory, a new job code can be calculated through the GPU or GPGPU only after calculations of loaded job codes are finished and the job codes are unloaded. When core utilization is high, it is necessary to wait until calculations of existing jobs are finished. However, even when core utilization is low, the dedicated memory may have no more space for loading a job code. In this case, it is likewise necessary to wait until calculation of an existing job is finished, and this inefficiency is problematic. The inefficiency becomes more severe when a dedicated memory provided in a commercialized GPU or GPGPU is insufficient.

SUMMARY

Aspects of the present disclosure provide a device and method for solving inefficiency in the utilization of a second-type processor, which has an improved capability in specialized calculation, caused when the core utilization of the second-type processor is low.

Aspects of the present disclosure also provide a device and method for improving inefficiency in the utilization of the second-type processor caused when the core utilization of the second-type processor is low in an environment in which virtualization technology has been applied to the second-type processor.

Aspects of the present disclosure also provide a device and method for improving the utilization of the second-type processor by executing a plurality of jobs through the second-type processor even when a code size of the plurality of jobs exceeds the memory capacity of the second-type processor.

It should be noted that objects of the present invention are not limited to the above-described objects, and other objects of the present invention will be apparent to those skilled in the art from the following descriptions.

According to the present disclosure, a job scheduling method performed in a computing system including a first-type processor and a second-type processor is provided. The method comprises measuring core utilization of the second-type processor, when the measured core utilization is less than a reference value, transmitting, by the first-type processor, a job suspension instruction to suspend a first job, which is currently being executed, to the second-type processor, in response to the job suspension instruction, copying data of a region occupied by the first job in a memory of the second-type processor to a main memory, copying data of a second job stored in the main memory to the memory of the second-type processor, and transmitting, by the first-type processor, an instruction to execute the second job to the second-type processor.

According to the present disclosure, a job scheduling method performed in a computing system including a first-type processor and a second-type processor is provided. The method comprises repeatedly loading jobs dequeued from a job queue into a memory of the second-type processor until no more job can be loaded, measuring core utilization of the second-type processor, when the measured core utilization is less than a reference value, selecting, by the first-type processor, one suspension job from among jobs currently being executed in the second-type processor and transmitting a job suspension instruction to suspend the selected suspension job to the second-type processor, in response to the job suspension instruction, copying data of a region occupied by the selected suspension job in the memory of the second-type processor to a main memory, copying data of a new job, which is selected from the job queue as a job constituting a job switching group together with the suspension job, to the memory of the second-type processor, transmitting, by the first-type processor, an instruction to execute the new job to the second-type processor, and monitoring the core utilization of the second-type processor and sequentially executing jobs belonging to the job switching group in the second-type processor every time the core utilization is less than the reference value.

According to the present disclosure, a calculator is provided. The calculator comprises a main memory to which a plurality of instructions are loaded, a first-type processor configured to execute the plurality of instructions loaded into the main memory; and a second-type processor including a dedicated memory. The plurality of instructions may include an instruction to measure core utilization of the second-type processor, an instruction to transmit a job suspension instruction to suspend a first job, which is currently being executed, to the second-type processor when the measured core utilization is less than a reference value, an instruction to copy data of a second job stored in the main memory to the memory of the second-type processor when data of a region occupied by the first job in the memory of the second-type processor is copied to the main memory in response to the job suspension instruction, and an instruction to transmit an instruction to execute the second job to the second-type processor.

BRIEF DESCRIPTION OF THE DRAWINGS

The above and other aspects and features of the present disclosure will become more apparent by describing in detail exemplary embodiments thereof with reference to the attached drawings, in which:

FIGS. 9A and 9B are diagrams illustrating the job scheduling method illustrated in FIGS. 6 to 8 with an example;

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Figure 1:
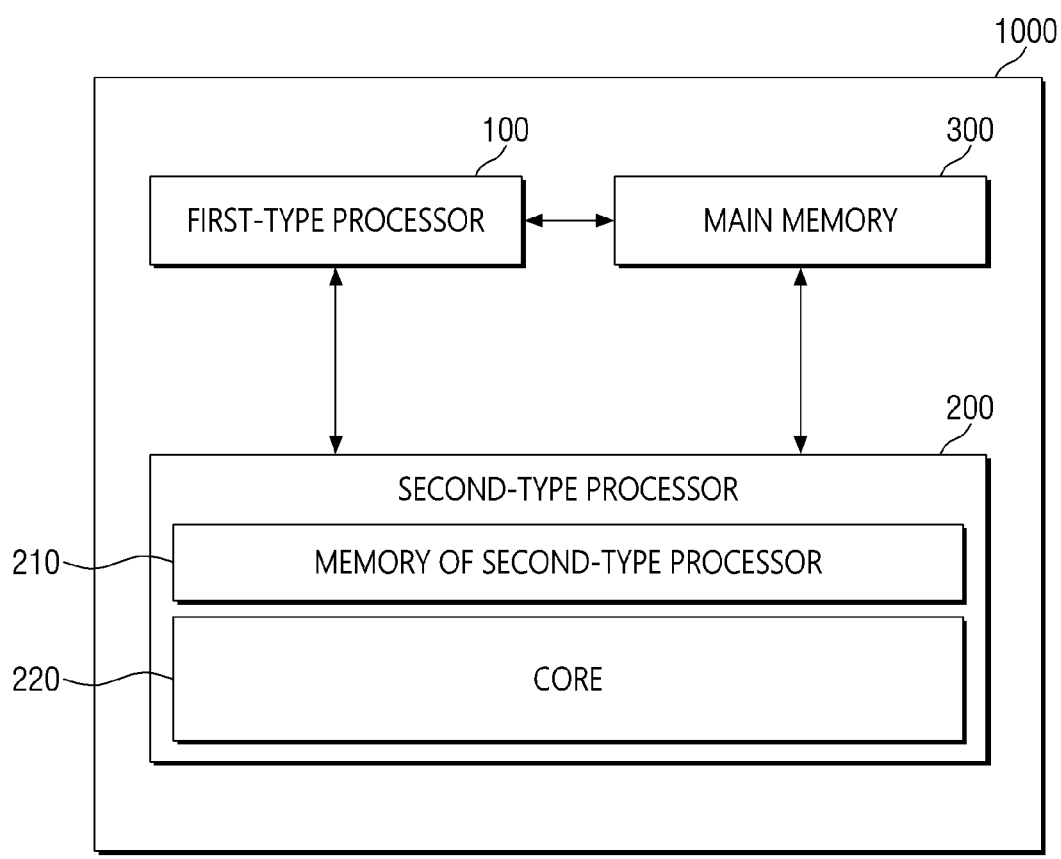
FIG. 1 is a block diagram of a calculator according to an exemplary embodiment of the present disclosure.

A configuration and operation of a calculator according to an exemplary embodiment of the present disclosure will be described with reference to FIG. 1. As shown in FIG. 1, a calculator 1000 according to the exemplary embodiment includes a first-type processor 100, a second-type processor 200, and a main memory 300.

The first-type processor 100 may be understood as a main processor of the calculator 1000 which executes an instruction loaded into the main memory 300. When the instruction requests a calculation from the second-type processor 200, the first-type processor 100 copies the instruction which is a calculation target and related data to a memory 210 of the second-type processor 200 and instructs the second-type processor 200 to carry out the calculation. The second-type processor 200 executes the instruction stored in the memory 210 through a core 220.

Hereinafter, the unit of a calculation task assigned to the second-type processor 200 is referred to as "job" in this specification.

In an exemplary embodiment, the second-type processor 200 may have a core 220 in which multiple cores with non-high performance are integrated in parallel and thus may be good at parallel calculations. The memory 210 of the second-type processor 200 is capable of both reading and writing and may be understood as, for example, a dynamic random access memory (DRAM). The memory 210 of the second-type processor 200 does not indicate a cache or a register provided in the second-type processor 200. The memory 210 of the second-type processor 200 may be packaged with the core 220 and other modules of the second-type processor 200. However, the memory 210 of the second-type processor 200 may be any memory to which instructions fetched to the core 220 of the second-type processor 200 are loaded, and the memory 210 is not necessary to be packaged with the core 220 of the second-type processor 200 and other modules.

When the memory 210 of the second-type processor 200 is packaged with the core 220 of the second-type processor 200 and other modules, it is difficult to expand the memory 210 of the second-type processor 200 after purchasing the second-type processor 200. Therefore, it is difficult to ensure sufficient capacity for a processing rate of the core 220 in practice.

Meanwhile, when no more new job can be loaded into the memory 210 of the second-type processor 200, a job which requires use of the second-type processor 200 has to wait until a job currently using the second-type processor is finished and unloaded from the memory 210 of the second-type processor 200. Like this, there is inefficiency that, if a job occupies the memory 210 of the second-type processor 200, other jobs cannot use the core 220 of the second-type processor 200 even when the job does not use the core 220 of the second-type processor 200.

However, as described above, after purchasing the second-type processor 200, it is difficult to expand the capacity of the memory 210 of the second-type processor 200 in order to solve the problem. Since the price of the second-type processor 200 is higher than that of the main memory 300, such inefficiency leads to economic loss.

Therefore, it is necessary to provide a method for increasing the utilization of the core 220 of the second-type processor 200 without expanding the memory 210 of the second-type processor 200. The calculator 1000 according to this exemplary embodiment of the present disclosure executes an improved job scheduling logic. The improved job scheduling logic involves i) measuring the core utilization of the second-type processor 200, ii) when the measured core utilization is less than a reference value, the first-type processor 100 transmitting a job suspension instruction for suspending a first job which is currently being executed to the second-type processor 200, iii) copying data of a region occupied by the first job in the memory 210 of the second-type processor 200 to the main memory 300 in response to the job suspension instruction, iv) copying data of a second job stored in the main memory 300 to the memory 210 of the second-type processor 200, and v) the first-type processor transmitting an instruction for commanding the second-type processor to execute the second job.

The improved job scheduling logic may be compiled in the form of a plurality of instructions, loaded into the main memory 300, and thus executed in the calculator 1000.

The improved job scheduling logic backs up a job, which has been loaded into the memory 210 of the second-type processor 200 but is not calculated through the core 220, to the main memory 300 and newly loads a new job, which requires a calculation by the second-type processor 200, into the memory 210 of the second-type processor 200, thereby increasing the utilization of the core 220 of the second-type processor 200. Operation and exemplary embodiments of the improved job scheduling logic will be described in detail below in this specification.

Figure 2:
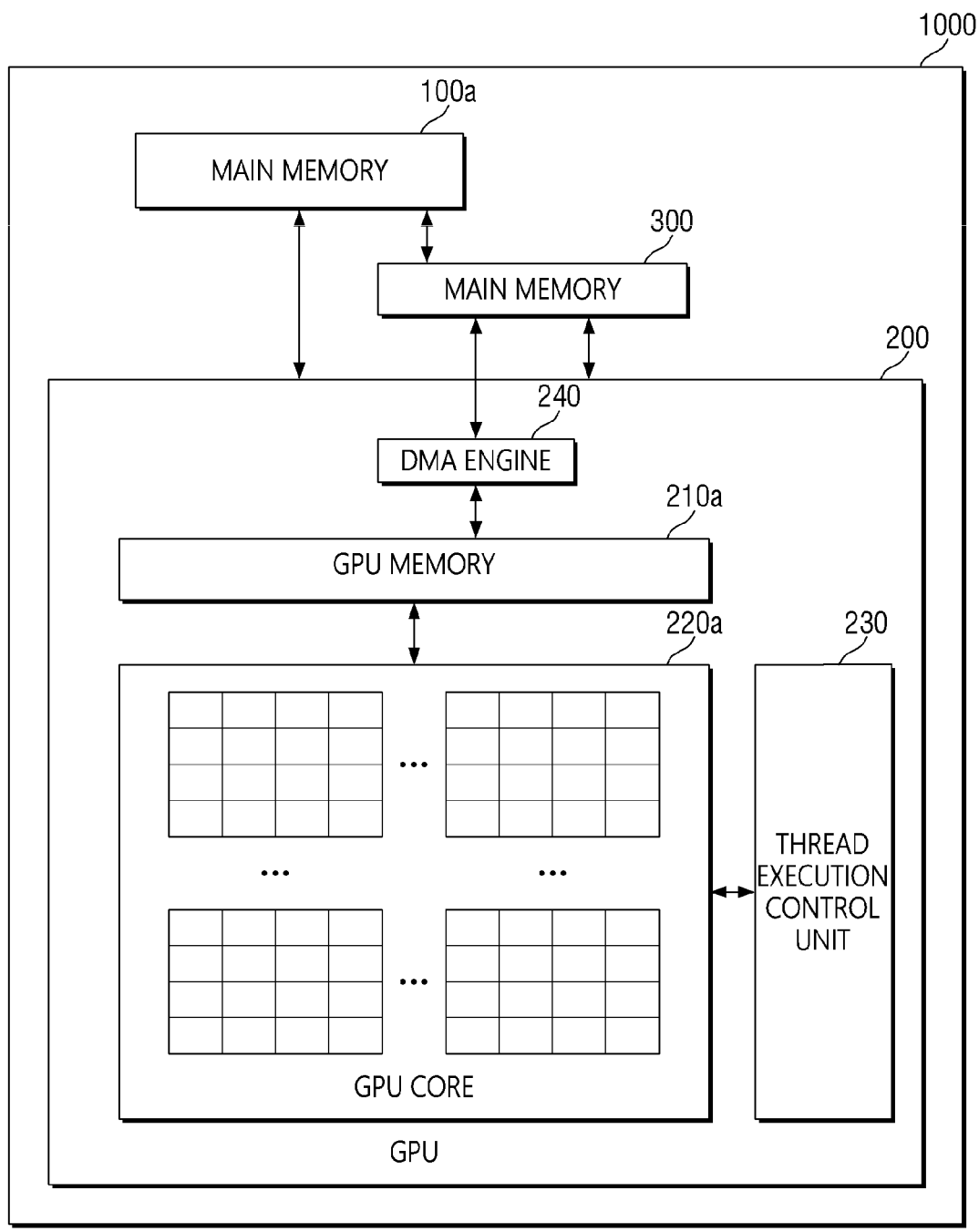
FIG. 2 is a block diagram of a calculator according to another exemplary embodiment of the present disclosure.

As shown in FIG. 2, in some exemplary embodiments, the second-type processor 200 may be a graphics processing unit (GPU) 200a. In this case, a direct memory access (DMA) engine may be provided in the GPU 200a so that a GPU memory 210a and the main memory 300 may rapidly exchange data through the DMA technology. Since the DMA engine 240 is provided, the improved job scheduling logic may be partially modified so that data of a region occupied by a first job in the GPU memory 210a of the GPU 200a may be directly copied to the main memory 300 using the DMA method and data of a second job stored in the main memory 300 may be directly copied to the GPU memory 210a of the GPU 200a using the DMA method.

The GPU 200a executes multithreading jobs in parallel through multiple GPU cores 220a. The parallel execution is controlled by a thread execution control unit 230.

Figure 3:
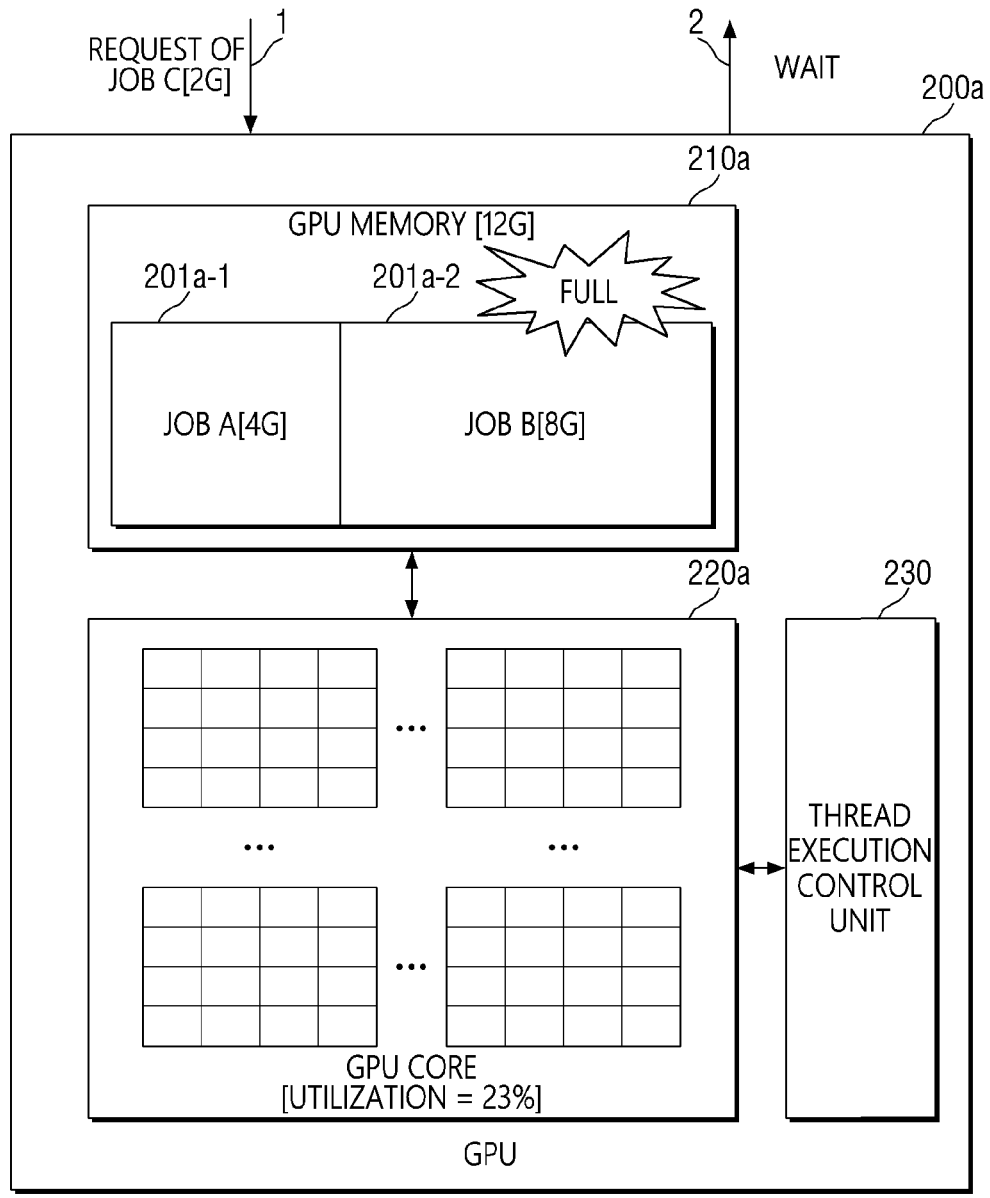
FIG. 3 is a diagram illustrating inefficiency in the utilization of a second-type processor solved by some exemplary embodiments of the present disclosure.

The inefficiency in the utilization of the GPU cores 220a which may be caused in the calculator 1000 of FIG. 2 will be described again with reference to FIG. 3. It is assumed that the GPU memory 210a provided in the GPU 200a has a capacity of 12 gigabytes, and a job A (201a-1) having a capacity of 4 gigabytes and a job B (201a-2) having a capacity of 8 gigabytes are loaded into the GPU memory 210a. In this case, even when the utilization of the GPU cores 220a is 23%, an execution request 1 of a new job C having a capacity of only 2 gigabytes has to wait until any one of the job A (201a-1) and the job B (201a-2) finishes using the GPU 200a and is unloaded from the GPU memory 210a. The improved job schedule logic backs up the job A (201a-1) or the job B (201a-2) to the main memory 300 and loads the job C into the GPU memory 210a so that the utilization of the GPU cores 220a may be increased.

Figure 4:
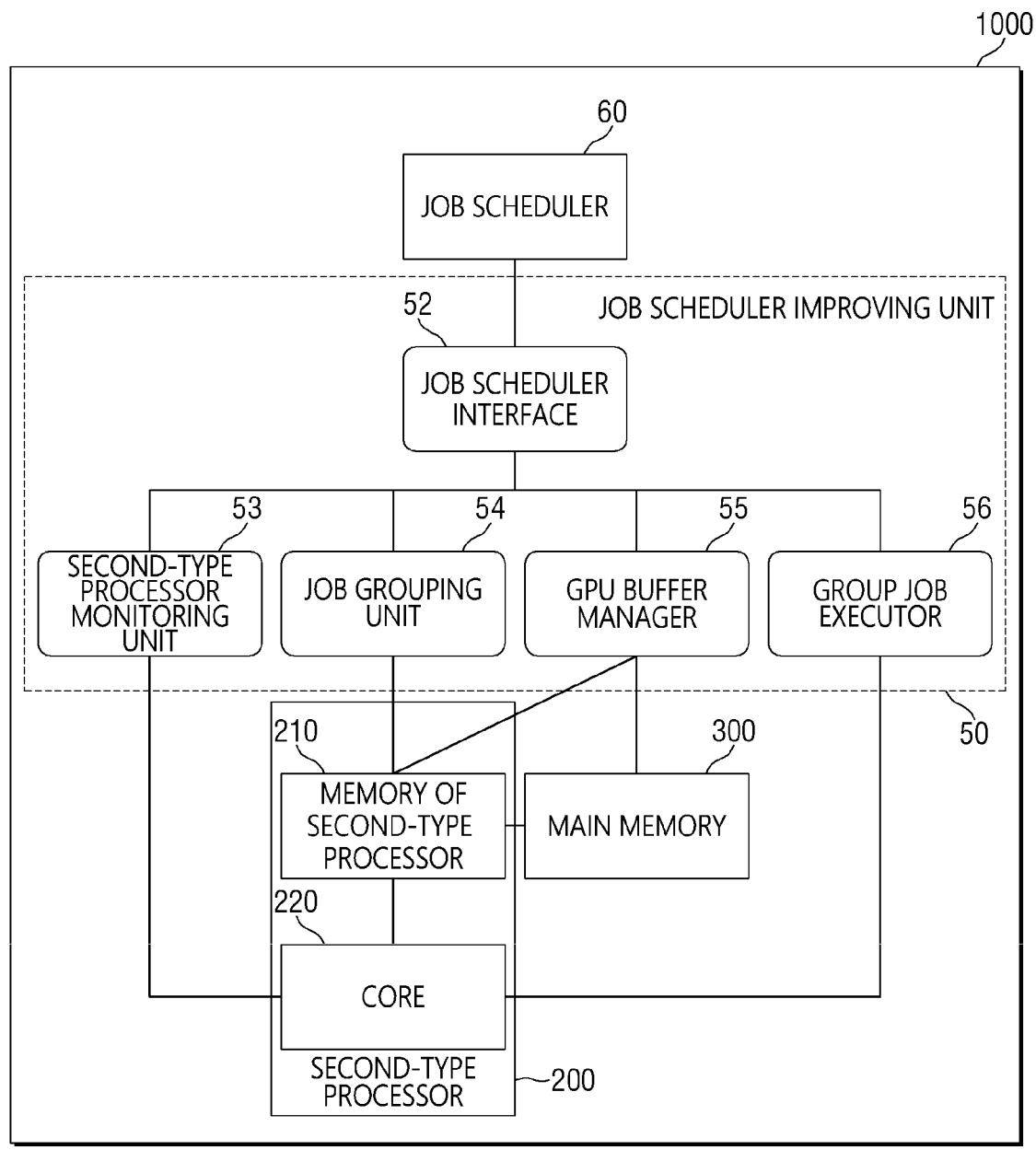
FIG. 4 is a block diagram of a calculator according to another exemplary embodiment of the present disclosure.

A configuration and operation of a calculator according to another exemplary embodiment of the present disclosure will be described below with reference to FIG. 4. As shown in FIG. 4, a calculator 1000 according to this exemplary embodiment includes a second-type processor 200, a main memory 300, a job scheduler 60, and a job scheduler improving unit 50.

The job scheduler improving unit 50 may include a job scheduler interface 52, a second-type processor monitoring unit 53, a job grouping unit 54, a GPU buffer manager 55, and a group job executor 56. For example, the job scheduler improving unit 50 may be implemented when a plurality of instructions loaded into the main memory 30 are executed by a central processing unit (CPU) (not shown).

The job scheduler 60 manages start, stop, restart, and end of jobs executed in the second-type processor 200 in response to a request of an instruction executed by the CPU (not shown). The job scheduler 60 may manage start, stop, restart, and end of each job according to priorities of jobs.

The job scheduler 60 may additionally have a function of virtualizing physical hardware and provisioning the virtualized physical hardware to each computing environment. The computing environment may be, for example, a virtual machine (VM), BareMetal, a container, or the like.

The job scheduler interface 52 relays data transmission and reception between the job scheduler 60 and the second-type processor monitoring unit 53, the job grouping unit 54, the GPU buffer manager 55, and the group job executor 56 and controls the overall logic flow of the job scheduler improving unit 50.

Figure 5:
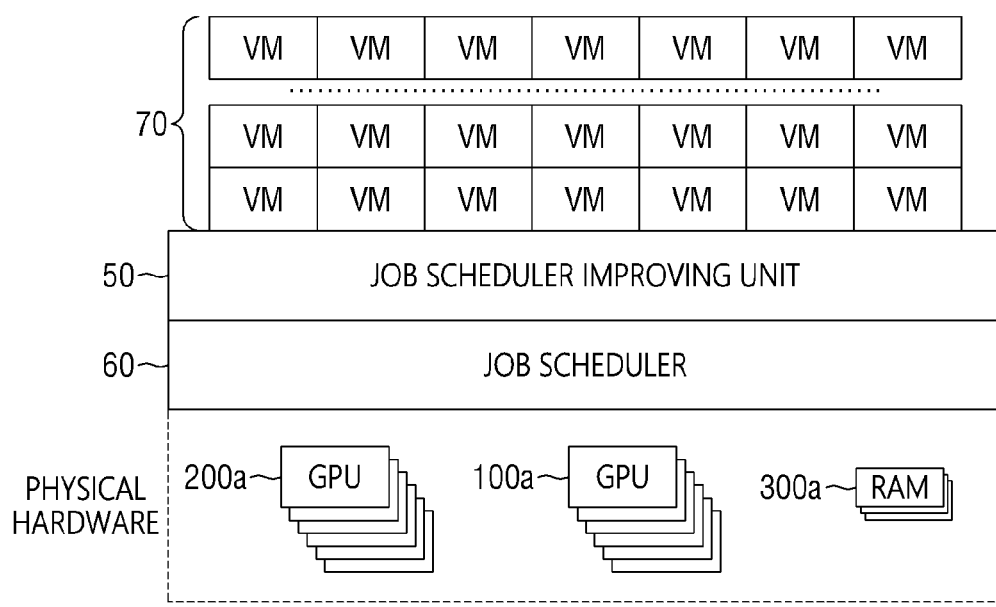
FIG. 5 is a diagram illustrating that some exemplary embodiments of the present disclosure can be applied to a virtualization environment.

The job scheduler improving unit 50 described with reference to FIG. 4 may also be applied to a GPU virtualization environment shown in FIG. 5. FIG. 5 shows the job scheduler improving unit 50 applied as a kind of middleware to an environment in which the job scheduler 60 virtualizes physical hardware including a plurality of GPUs 200a, a plurality of CPUs 100a, and a plurality of random access memories (RAMs) and provisions the virtualized physical hardware to a plurality of computing environments 70. VMs are shown in FIG. 5 as an example of the plurality of computing environments 70, but the description of FIG. 4 may be applied to various computing environments, such as BareMetal and a container.

Assuming that the job scheduler improving unit 50 is applied to a GPU virtualization environment, operation of the job scheduler improving unit 50 will be described below.

The job scheduler 60 dequeues a job from a job queue, selects a GPU 200 whose GPU memory 210 required by the job is available, and assigns the GPU 200 to the job. The job performs parallel calculations using the GPU core 220. While the GPU memory 210 is available, the job scheduler 60 continuously assigns a new job obtained from the job queue to the same GPU 200. The second-type processor monitoring unit 53 constantly monitors the GPU 200 at regular time intervals, and the job grouping unit 54 groups jobs loaded into the GPU memory 210 according to the size of a region into which each job is loaded.

When the second-type processor monitoring unit 53 detects that a free space of the GPU memory 210 of a specific GPU 200 is a reference value or less (i.e., the GPU memory 210 is full) but the utilization of the core 220 is a reference value or less, the job scheduler interface 52 requests a standby job (a job A) to be newly executed from the job queue of the job scheduler 60 on the basis of job grouping information managed by the job grouping unit 54.

Subsequently, the group job executor 56 sequentially selects one of jobs occupying the GPU memory 210 (a job B), requests the GPU buffer manager 55 to copy the GPU memory 210 occupied by the job B to the main memory 300, and requests the job scheduler 60 to suspend execution of the selected job B.

After execution of the job B is suspended, the group job executor 56 requests the job scheduler interface 52 to execute the job A. The job scheduler interface 52 requests the job scheduler 60 to execute the job A. The job grouping unit 54 includes the jobs A and B in the same job switching group. Jobs in the job switching group use similar sizes of GPU memory. However, these jobs are not simultaneously executed due to the size of GPU memory and sequentially executed under the control of the group job executor 56.

A job scheduling method according to another exemplary embodiment of the present disclosure will be described below with reference to FIG. 6. The job scheduling method according to this exemplary embodiment may be performed by a computing device including a first-type processor and a second-type processor. However, when the job scheduling method according to this exemplary embodiment is performed in a virtualized environment, at least some of operations constituting the method according to this exemplary embodiment may be performed in different physical computing devices.

In operation S100, the core utilization of a second-type processor is measured. When the measured utilization is not less than a reference value, job scheduling may be performed in an existing method (S103).

When the measured core utilization is less than the reference value, the calculation quantity of a core of the second-type processor for a job occupying the second-type processor is not large. Therefore, in operation S104, the first-type processor transmits a job suspension instruction to the second-type processor. When one job has been loaded into the memory of the second-type processor, the job becomes a job to be suspended, and when a plurality of jobs have been loaded into the memory of the second-type processor, one job selected on the basis of a certain criterion becomes a job to be suspended.

When a plurality of jobs have been loaded into the memory of the second-type processor and none of the plurality of jobs has been suspended in the second-type processor by a job suspension instruction, one job to be suspended is selected on the basis of the certain criterion according to at least one of the memory size of the second-type processor for each job, the core utilization of the second-type processor for each job, and priorities given to the jobs. On the other hand, when jobs have been suspended in the second-type processor by a job suspension instruction among the plurality of jobs, one of the jobs which have been suspended is selected as a job to be suspended.

Hereinafter, a job which is suspended in the second-type processor is referred to as a "target-of-processor-switching job."

In some exemplary embodiments, the target-of-processor-switching job may be determined to be plural rather than singular on the basis of a certain criterion. For example, as the core utilization becomes more less than the reference value, a job corresponding to a larger ratio of the total memory capacity of the second-type processor may be switched. For example, when the reference value of core utilization is 50% and a measured core utilization is 10%, 40% of the total memory capacity of the second-type processor may be considered a target of switching. Assuming that the total memory capacity of the second-type processor is 10 gigabytes, it is necessary to switch a job corresponding to 4 gigabytes. In this case, when no job has a capacity of 4 gigabytes and there are only jobs having a smaller capacity, jobs having a larger capacity may be designated as target-of-processor-switching jobs.

In operation S106, data of the target-of-processor-switching job (a first job), which is occupying the memory of the second-type processor, is copied to the main memory. This is intended to back up task results of the target-of-processor-switching job.

Subsequently, in operation S108, a job to be executed instead of the first job in the second-type processor is selected, and data of the selected job (a second job) is copied to the memory of the second-type processor. In order to achieve the objects of the present disclosure, it is important to appropriately select a job to be executed in the second-type processor. The selected job is required to use the core of the second-type processor more than the first job does. With regard to this, various exemplary embodiments will be described below with reference to FIGS. 9A and 9B.

Subsequently, in operation S110, when the first-type processor transmits an instruction to execute the second job to the second-type processor, the second-type processor executes the second job.

Effects of this exemplary embodiment are as follows. When the sum of sizes of all jobs loaded into the second-type processor is similar to the memory capacity of the second-type processor, the memory of the second-type processor is substantially full. Consequently, it is not possible to load an additional job to the memory of the second-type processor. For this reason, according to a related art, if the memory of the second-type processor is substantially full, it is difficult to take an action even when the core utilization of the second-type processor is low. In this case, there is no choice but to wait until a job loaded into the second-type processor is finished and a new job is executed in a memory space of the second-type processor which has been occupied by the finished job so that the core utilization may be increased.

On the other hand, according to this exemplary embodiment, even when no more job can be loaded into the second-type processor because the memory of the second-type processor is substantially full, it is possible to simultaneously execute jobs having a size exceeding the memory capacity of the second-type processor by using the main memory, which is relatively inexpensive, as a buffer of the memory of the second-type processor. For this reason, it is possible to efficiently use the second-type processor which is relatively expensive. In this process, a job which is moved from the memory of the second-type processor to the main memory may be executed in the first-type processor and loaded again to the memory of the second-type processor when a calculation by the second-type processor is required. This will be described in detail below with reference to FIG. 10.

Figure 6:
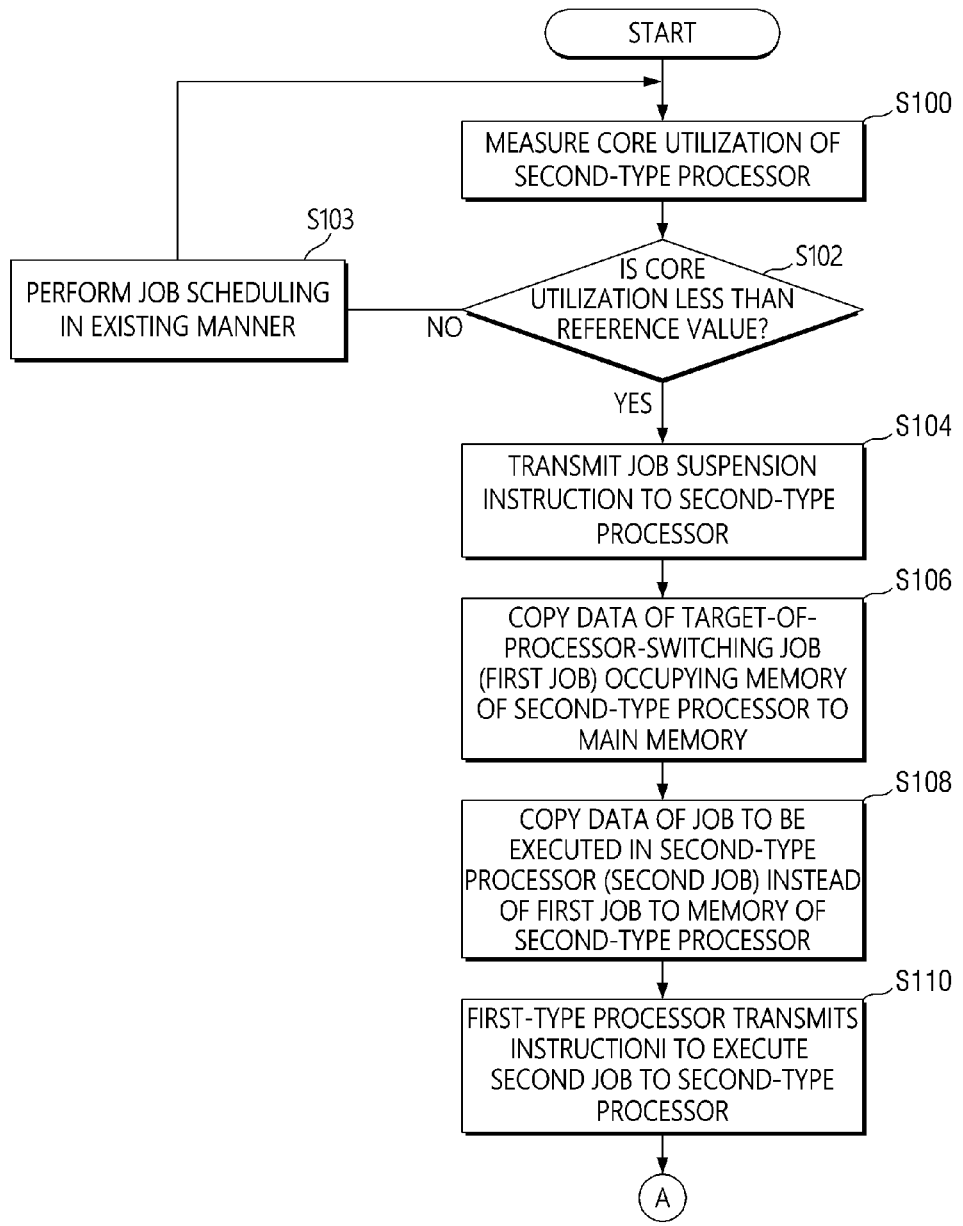
FIG. 6 is a flowchart illustrating a job scheduling method according to another exemplary embodiment of the present disclosure.

A partially modified embodiment of the exemplary embodiment described with reference to FIG. 6 is described now with reference to FIG. 7. The flowchart shown in FIG. 7 differs from the flowchart of FIG. 6 in that an operation for causing the second-type processor to execute an additional job because the core utilization is less than the reference value is performed only when a job loaded into the memory of the second-type processor is in a stable state. This is described now in detail.

In operation S98, it is checked whether a job loaded into the memory of the second-type processor is in a stable state. At this time, only when all jobs loaded into the memory of the second-type processor are in a stable state, it may be determined in operation S99 that the jobs are in stable states, and the process may proceed to operation S100 of measuring the core utilization of the second-type processor. Alternatively, when one or more jobs loaded into the memory of the second-type processor are in stable states, it may be determined in operation S99 that jobs are in stable states, and the process may proceed to step S100 of measuring the core utilization of the second-type processor. When it is determined that a job loaded into the memory of the second-type processor is not in a stable state, job scheduling is performed in an existing manner (S103).

Figure 7:
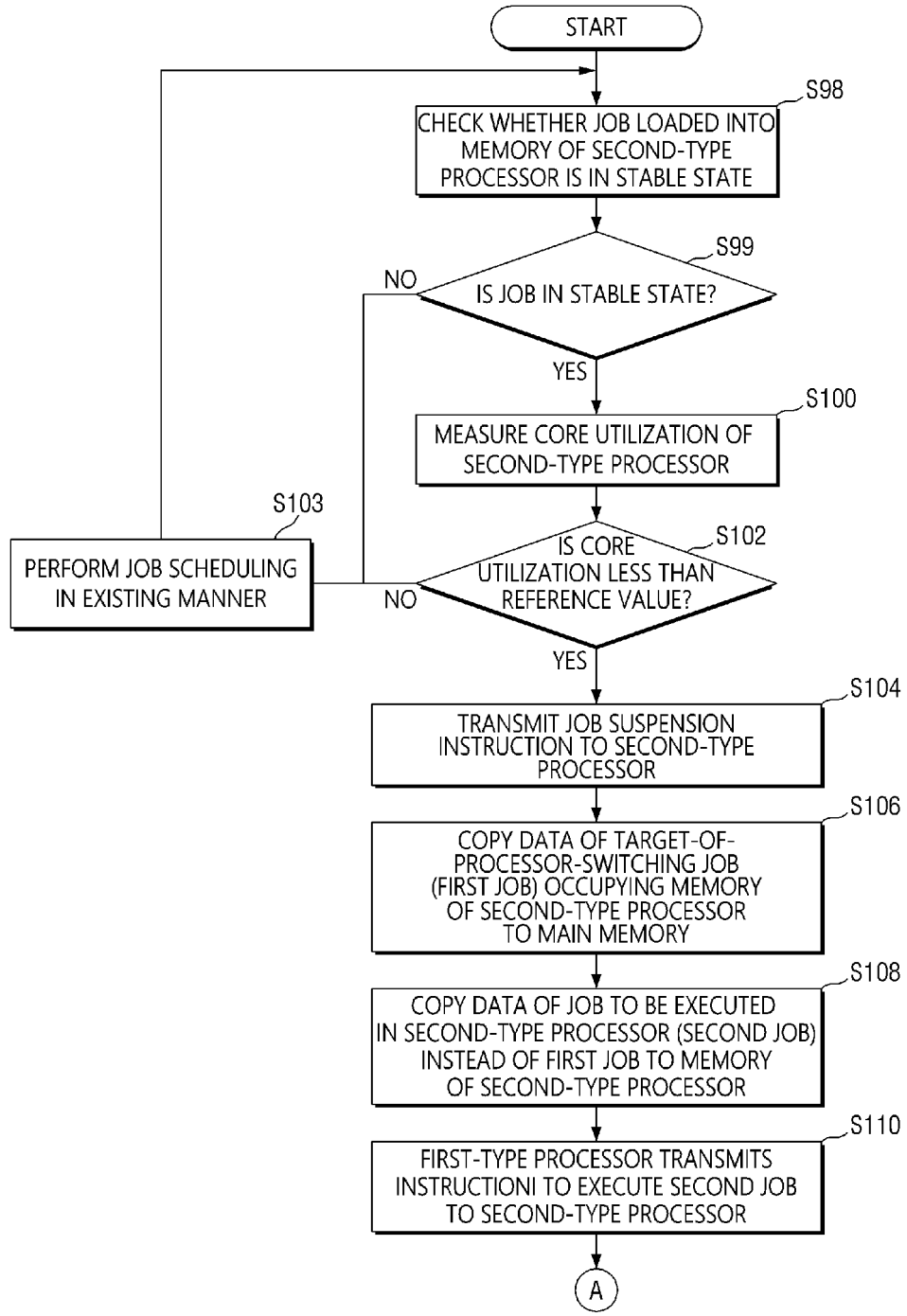
FIGS. 7 and 8 are flowcharts illustrating an embodiment partially modified from the job scheduling method illustrated in FIG. 6.

The second-type processor specialized in multithreaded calculations, such as a GPU, is effective in the exemplary embodiment of FIG. 7 related to determination of stabilization. The reason is that when execution of a job including multithreaded calculations and general calculations is started and the initial stages of logic pass, multithreaded calculations and general calculations are periodically repeated in many cases. This may be easily understood by considering that a job including multithreaded calculations and general calculations has no choice but to include a loop calculation. Therefore, in order to efficiently use a second-type processor, it is helpful to move a job, which is in a stable state so that multithreaded calculations and general calculations are periodically repeated, to the first-type processor rather than to carelessly move a job to the first-type processor before the job is stabilized in the second-type processor.

When a ratio of a time period in which the first-type processor is used by a job to a time period in which the second-type processor is used by the job does not deviate from a certain value by a reference error, the job may be determined to be in a stable state.

Figure 8:
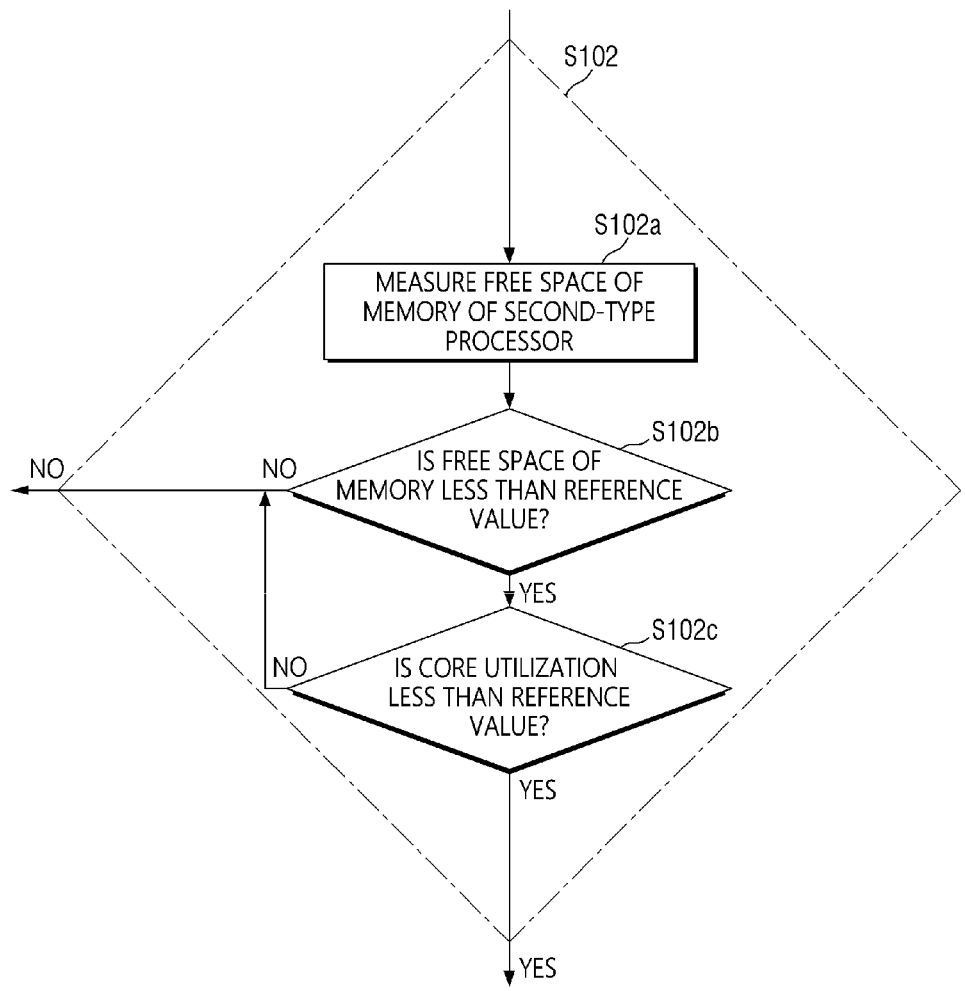

Some modified embodiments of the exemplary embodiment described above with reference to FIG. 6 are described now with reference to FIG. 8. In FIG. 6, operations S104, S106, S108, and S110 are performed on the only condition that the core utilization of the second-type processor is less than the reference value. In other words, according to the exemplary embodiment described above with reference to FIG. 6, when the core utilization of the second-type processor is less than the reference value, a job loaded into the memory of the second-type processor is replaced regardless of whether the memory of the second-type processor is full. On the other hand, according an exemplary embodiment which will be described with reference to FIG. 8, operations S104, S106, S108, and S110 are performed on the only when a free space of the memory of the second-type processor is less than a reference value (i.e., the memory is full) and the core utilization of the second-type processor is less than the reference value.

According to the exemplary embodiment shown in FIG. 8, it is determined in operation S102 that the core utilization of the second-type processor is less than the reference value only when a free space (i.e., a space other than a space to which a specific job is loaded, that is, a space occupied by the specific job) of the memory of the second-type processor is measured (S102*a*) to be less than a reference value (S102*b*) and the core utilization of the second-type processor is less than the reference value (S102*c*). The free space less than the reference value (S102*b*) may indicate that a data size of the free space is less than a reference value or a ratio of the data size of the free space to the total memory capacity of the second-type processor is less than a reference value.

In the exemplary embodiments described above with reference to FIGS. 6 to 8, it is important to determine which job is moved from the memory of the second-type processor to the memory of the first-type processor and which job is executed in the second-type processor instead. As described above, this is because the core utilization of the second-type processor will be improved when the job newly executed in the second-type processor uses the core of the second-type processor more than the existing job does. A method of selecting a job to be moved from the second-type processor to the first-type processor and a method of selecting a job to be executed in the second-type processor are described now with an example with reference to FIGS. 9A and 9B.

Figure 9A:
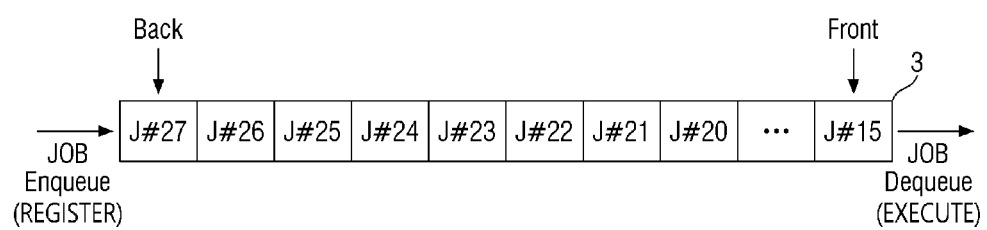

FIG. 9A shows a job queue 3. A job scheduler manages execution of jobs requested by various kinds of applications or services using the job queue 3. The requested jobs are enqueued in the job queue 3, and the job scheduler dequeues one or more jobs from the job queue 3 and executes the dequeued jobs. Since the queue is a data structure which operates on a first-in first-out (FIFO) basis, jobs are basically executed in order of request.

FIG. 9B shows an example of information table of jobs. The information table may be managed by, for example, the job scheduler interface described above with reference to FIG. 4. To aid in understanding, it is assumed in FIG. 9B that the first-type processor is a CPU and a second-type processor is a GPU. The information table of FIG. 9B is based on the assumption that an improved job scheduler operates in a GPU virtualization environment like described above with reference to FIG. 5. Accordingly, two physical GPUs are shown to be virtualized and provided to jobs (GPU identities (IDs) of G #41 and G #42). An example of processing G #41 is described now.

In FIG. 9B, a total of two jobs J #8 and J #9 are being executed in the GPU G #41 (i.e., have been loaded into the GPU memory). It is assumed that a GPU memory size is 12 gigabytes and a setting is made to perform scheduling when a free GPU memory size is less than 15% and the GPU core utilization is less than 50%. In the situation shown in FIG. 9B, a free space of the GPU memory is 1.2 gigabyte which is 10% of the GPU memory, and the GPU core utilization is only 21%. Therefore, scheduling is required to arrange jobs loaded into the GPU memory. Meanwhile, J #10, J #11, and J #12 are being executed in the CPU and have never gone through a GPU calculation yet. Consequently, there is no information on GPU memory requirements and job switching groups.

First, it is necessary to select one or more jobs of J #8 and J #9 as target-of-processor-switching jobs.

In an embodiment in which whether a job has been stabilized is not taken into consideration, both J #8 and J #9 may be selected as target-of-processor-switching jobs. In an embodiment in which only a stabilized job is selected as a target-of-processor-switching job, J #9 in a stable state is selected as a target-of-processor-switching job. To aid in understanding, it is described now according to exemplary embodiments which job is executed in the GPU instead of J #9 when J #9 is selected as a target-of-processor-switching job. Hereinafter, a job selected to be executed in the GPU instead of J #9 will be referred to as "J #9 switching job."

It is meaningless to hold a calculation by the CPU for a job on which the CPU is performing the calculation and start a GPU calculation. Therefore, according to an exemplary embodiment, the J #9 switching job may be selected from among jobs which have been executed in the CPU and are waiting to use the GPU for GPU calculations. According to this exemplary embodiment, the J #9 switching job is selected from among J #3, J #4, J #5, J #6, and J #7.

Meanwhile, since the GPU memory capacity of J #9 is emptied, the GPU capacity of the J #9 switching job has to be equal to or less than that of J #9. With this regard, it has been described that a job switching group is formed. The GPU memory requirement of J #9 is 5.2 gigabytes, and J #9 belongs to a group Under 6G. Accordingly, the J #9 switching job is limited to the group Under 6G or a group Under 2G. Consequently, the J #9 switching job is selected from among J #4, J #5, J #6, and J #7.

However, in terms of efficiency, the J #9 switching job may have the same GPU capacity as J #9. According to this exemplary embodiment, the J #9 switching job is limited to the group Under 6G. Consequently, the J #9 switching job may be selected from among J #5, J #6, and J #7. Meanwhile, according to an exemplary embodiment, a job in a stable state may be selected first as a job to be performed in the GPU. Since a job in a stable state periodically repeats GPU calculations and CPU calculations, it is possible to maximize efficiency in using the GPU according to the periods. According to this exemplary embodiment, the J #9 switching job may be selected from among J #4, J #6, and J #7.

According to an exemplary embodiment, a job which has been generated by the same VM as J #9 may be selected as the J #9 switching job. In this way, a job switching group may be composed of jobs generated by the same VM. When the job switching group is composed of jobs generated by the same VM, calculations by the VM may be expected to be stably and rapidly finished. Since J #9 has been generated by VM #1, the J #9 switching job may be selected between J #5 and J #6 according to this exemplary embodiment.

According to an exemplary embodiment, the J #9 switching job may be selected on the basis of the priorities of jobs. According to this exemplary embodiment, the J #9 switching job may be selected between J #5 and J #6 which have the highest priority among J #4, J #5, J #6, and J #7. In some exemplary embodiments, the priorities given to jobs may be determined on the basis of priorities given to VMs which have generated the jobs. In this way, a job generated by a VM having a high priority may start a GPU calculation before other jobs.

According to an exemplary embodiment, the J #9 switching job may be sequentially selected from jobs of the job switching group to which J #9 belongs.

The above-described exemplary embodiments related to selection of the J #9 switching job may be applied in combination as necessary.

Figure 10:
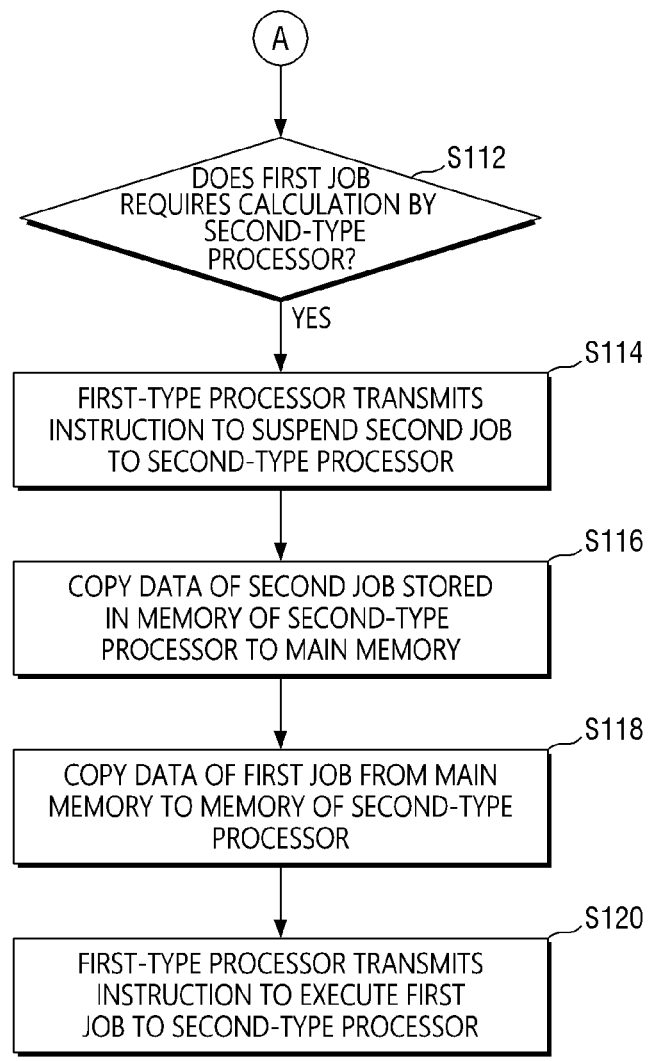
FIG. 10 is a flowchart illustrating follow-up operations of the job scheduling method illustrated in FIGS. 6 to 8.

Follow-up operations of the job scheduling methods described above with reference to FIGS. 6 to 8 are described now with reference to FIG. 10. It has been described above that the first job which has been executed in the second-type processor is forcedly moved to the first-type processor with reference to FIGS. 6 to 8. The first job is copied to the main memory, and calculations of the first-type processor are performed by using the copied first job.

In operation S112, when the first job finishes a calculation by the first-type processor and requires a calculation by the second-type processor, it is detected that a calculation by the second-type processor is required. The detection may be performed in a software manner such as hooking a function of requesting a calculation by the second-type processor.

In operation S112, when it is detected that the first job requires a calculation by the second-type processor, processor switching may be performed between the first job and the second job. In the relationship with the second job, this may be understood as an operation of giving priority for using the second-type processor to the first job which has been originally executed in the second-type processor. FIG. 10 sequentially shows a processor switching process between the first job and the second job. In operation S114, the first-type processor transmits an instruction to suspend the second job to the second-type processor, and in operation S116, data of the second job stored in the memory of the second-type processor is copied to the main memory. In operation S118, data of the first job is copied from the main memory to the memory of the second-type processor, and in operation S120, the first-type processor transmits an instruction to execute the first job to the second-type processor. Then, the first job returns to the original state in which the first job is executed in the second-type processor, and the second job also returns to the original state in which the second job is executed in the first-type processor.

Figure 11:
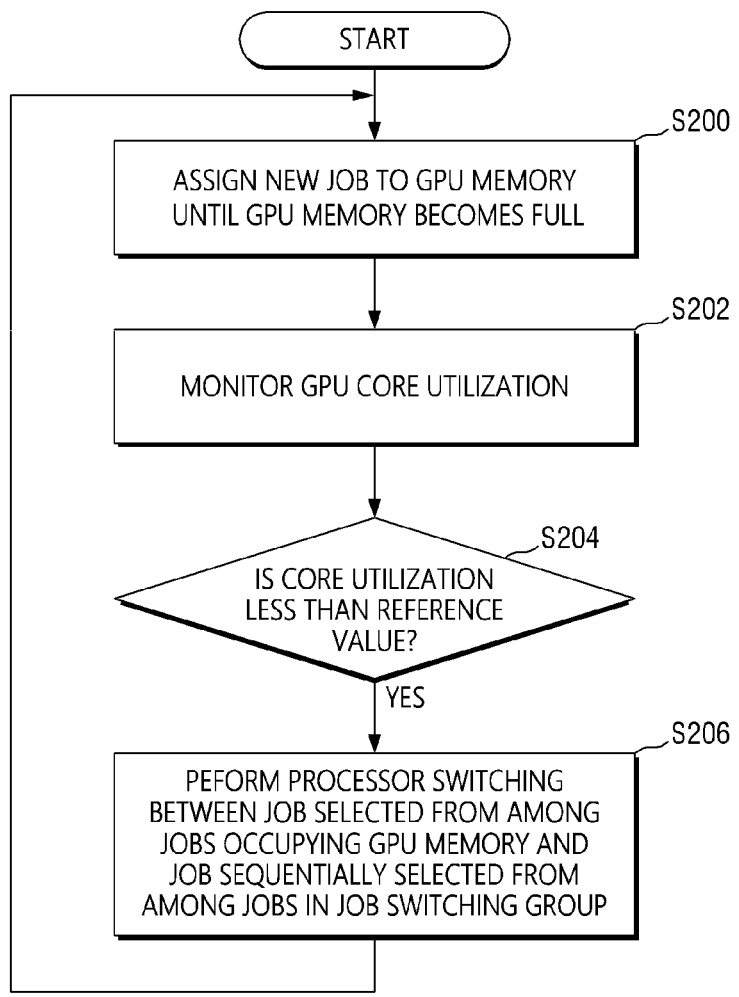
FIG. 11 is a flowchart illustrating the job scheduling method according to another exemplary embodiment of the present disclosure.

Next, a job scheduling method according to another exemplary embodiment of the present disclosure will be described with reference to FIG. 11.

In operation S200, a new job is assigned to a GPU memory until the GPU memory becomes full. It will be understood that a job is repeatedly dequeued from a job queue and loaded into the GPU memory until no more job can be loaded.

Subsequently, the GPU core utilization is monitored (S202). When the core utilization is less than the reference value (S204), processor switching is performed between a job which is selected from among jobs occupying the GPU memory on the basis of a certain criterion (e.g., the criteria described above with reference to FIG. 9B) and a job sequentially selected from among jobs belonging to a job switching group of the selected job (S206). Operation S206 may be performed through the following detailed operations.

When the measure core utilization is less than the reference value, the first-type processor selects one suspension job from among jobs which are currently being executed in the second-type processor and transmits a job suspension instruction to suspend the selected job to the second-type processor. Then, in response to the job suspension instruction, data of a region occupied by the selected suspension job in the memory of the second-type processor is copied to the main memory. Subsequently, data of a new job, which is selected from the job queue as a job constituting the job switching group together with the suspension job, is copied to the memory of the second-type processor. Then, the first-type processor transmits an instruction to execute the new job to the second-type processor. Subsequently, the core utilization of the second-type processor is monitored, and every time the core utilization is less than the reference value, jobs belonging to the job switching group are selected one by one and executed in the second-type processor.

The exemplary embodiment described above with reference to FIG. 11 will be described in further detail with examples of FIGS. 12A to 12D.

FIGS. 12A to 12D are described on the basis of the following assumptions:

Assumption 1: The total sum of capacities of a first job memory GM1 to an $i^{th}$ job memory GMi is less than the capacity of a memory 210 of a second-type processor, but the total sum of capacities of the first job memory GM1 to an $(i+1)^{th}$ job memory GM(i+1) is greater than the capacity of the memory 210 of the second-type processor. Therefore, when jobs are sequentially loaded into the memory 210 of the second-type processor beginning with the first job, jobs can be loaded up to the $i^{th}$ job.

Assumption 2: The memory size of the $(i-1)^{th}$ job=the memory size of the $i^{th}$ job=the memory size of the $(i+1)^{th}$ job. Therefore, the $(i-1)^{th}$ job, the $i^{th}$ job, and the $(i+1)^{th}$ job constitute a job switching group.

Figure 12A:
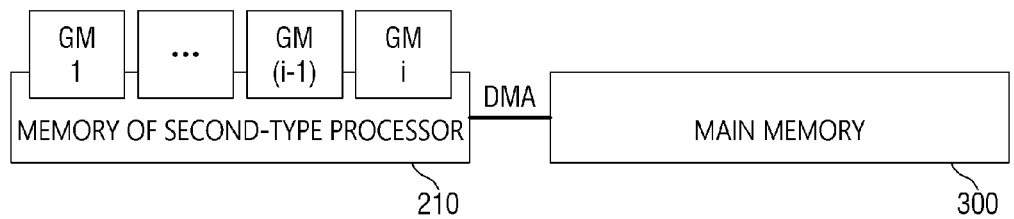
FIGS. 12A to 12D are diagrams illustrating results of FIG. 11 with an example.

FIG. 12A shows a situation in which the first job memory GM1 to the $i^{th}$ job memory GMi are sequentially loaded into the memory 210 of the second-type processor. In this situation, the memory 210 of the second-type processor has insufficient space to load the $(i+1)^{th}$ job. In this case, when the core utilization of the second-type processor is less than a reference value, the $i^{th}$ job in the job switching group of the $(i-1)^{th}$ job, the $i^{th}$ job, and the $(i+1)^{th}$ job may be moved to a main memory 300 as shown in FIG. 12B, and instead the $(i+1)^{th}$ job may be loaded into the memory 210 of the second-type processor and may perform a calculation of the second-type processor.

Figure 12B:
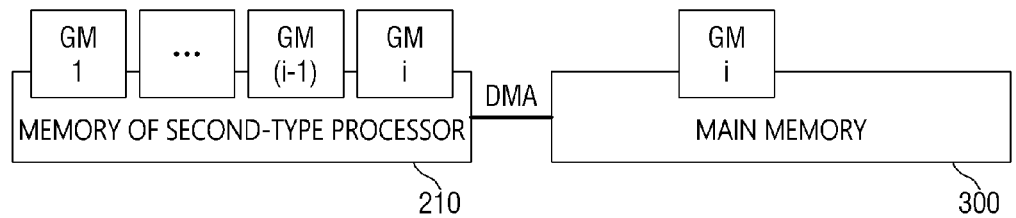
Figure 12C:
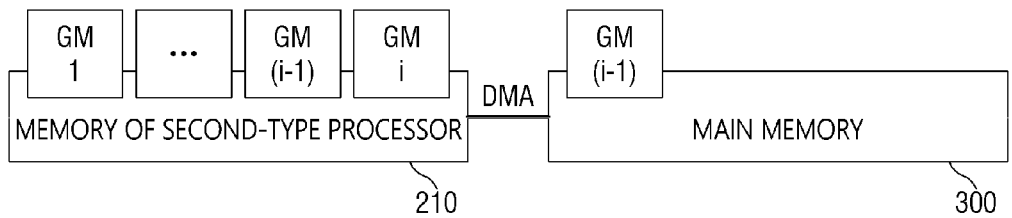

When the $i^{th}$ job requires a calculation of the second-type processor in the situation shown in FIG. 12B, the $(i-1)^{th}$ job in the job switching group of the $(i-1)^{th}$ job, the $i^{th}$ job, and the $(i+1)^{th}$ job may be moved to the main memory 300 as shown in FIG. 12C, and instead the $i^{th}$ job may be loaded into the memory 210 of the second-type processor and may perform a calculation by the second-type processor.

Figure 12D:
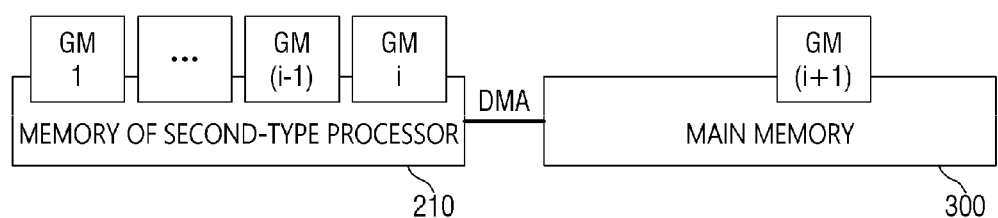

When the $(i-1)^{th}$ job requires a calculation by the second-type processor in the situation shown in FIG. 12C, the $(i+1)^{th}$ job in the job switching group of the $(i-1)^{th}$ job, the $i^{th}$ job, and the $(i+1)^{th}$ job may be moved to the main memory 300 as shown in FIG. 12D, and instead the $(i-1)^{th}$ job may be loaded into the memory 210 of the second-type processor and may perform a calculation by the second-type processor.

As shown in FIGS. 12A to 12D, jobs belonging to the job switching group may be sequentially loaded into the memory 210 of the second-type processor and may perform calculations by the second-type processor. In reverse, this also means that jobs belonging to the job switching group may be sequentially moved from the memory 210 of the second-type processor to the main memory 300.

In this exemplary embodiment, processor switching is performed when a job in the main memory requires a calculation by the second-type processor. Therefore, the job moved from the main memory to the second-type processor directly uses the core of the second-type processor in the second-type processor. Consequently, the core utilization of the second-type processor is increased.

Also, according to the related art, only i jobs can be simultaneously executed in the second-type processor whereas (i+1) jobs can be simultaneously executed according to this exemplary embodiment. In other words, according to this exemplary embodiment, it is possible to increase the number of jobs that can be simultaneously executed without additional resources.

The above-described methods according to exemplary embodiments of the present disclosure can be performed by executing a computer program embodied into computer-readable code. The computer program may be transmitted from a first electronic device to a second electronic device through a network, such as the Internet, and installed in the second electronic device so that the computer program can be used in the second electronic device. The first and second electronic devices include all fixed electronic devices such as a server device, a physical server belonging to a server pool for cloud service, and a desktop personal computer (PC).

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A job scheduling method performed in a computing system including a first-type processor and a second-type processor, the method comprising:

measuring core utilization of the second-type processor;
when the measured core utilization is less than a reference value, transmitting, by the first-type processor, a job suspension instruction to suspend a first job, which is currently being executed, to the second-type processor;
in response to the job suspension instruction, copying data of a region occupied by the first job in a memory of the second-type processor to a main memory;
copying data of a second job stored in the main memory to the memory of the second-type processor; and
transmitting, by the first-type processor, an instruction to execute the second job to the second-type processor,
wherein the second job belongs to job switching group same as the first job; and
the job switching group is comprised of a plurality of jobs which require memory sizes of the second-type processor within a certain range allocated to the job switching group.

2. The job scheduling method of claim 1, further comprising measuring free space of the memory of the second-type processor, wherein the transmitting of the job suspension instruction comprises, when the free space of the memory is less than a reference value and the measured core utilization is less than the reference value, transmitting, by the first-type processor, the job suspension instruction to suspend the first job, which is currently being executed, to the second-type processor.

3. The job scheduling method of claim 1, wherein the transmitting of the job suspension instruction comprises, when the measured core utilization is less than the reference value and the first job uses the second-type processor in a stable state, transmitting, by the first-type processor, the job suspension instruction to suspend the first job, which is currently being executed, to the second-type processor.

4. The job scheduling method of claim 3, wherein in the stable state, a ratio of a use time of the first-type processor to a use time of the second-type processor does not deviate from a certain value by a reference error.

5. The job scheduling method of claim 1, wherein the second-type processor is a graphics processing unit (GPU).

6. The job scheduling method of claim 5, wherein the memory of the GPU and the main memory exchange data with each other in a direct memory access (DMA) manner;
the copying of the data of the region occupied by the first job in the memory of the second-type processor to the main memory comprises directly copying the data of the region occupied by the first job in the memory of the second-type processor to the main memory in the DMA manner; and
the copying of the data of the second job stored in the main memory to the memory of the second-type processor comprises directly copying the data of the second job stored in the main memory to the memory of the second-type processor in the DMA manner.

7. The job scheduling method of claim 1, wherein the second job is selected from among jobs which wait to use the second-type processor while being executed through the first-type processor.

8. The job scheduling method of claim 1, wherein a plurality of jobs included in the job switching group to which the first job belongs are sequentially selected as the second job.

9. The job scheduling method of claim 1, wherein the second job requires the memory of the second-type processor corresponding to a size of region occupied by the first job in the memory of the second-type processor or less and waits to use the second-type processor while being executed through the first-type processor.

10. The job scheduling method of claim 1, wherein when a total memory requirement of two or more jobs does not exceed a memory capacity of the second-type processor, the second-type processor supports the two or more jobs to simultaneously use the second-type processor; and
the transmitting of the job suspension instruction comprises transmitting, by the first-type processor, a job suspension instruction to suspend the first job between the first job and a third job which are currently being executed to the second-type processor.

11. The job scheduling method of claim 10, wherein the second-type processor is a graphics processing unit (GPU);
some of the two or more jobs are executed by the GPU in a first computing environment provisioned by a job scheduler; and
at least some among others of the two or more jobs are executed by the GPU in a second computing environment provisioned by the job scheduler.

12. The job scheduling method of claim 11, wherein the second job belongs to the same job switching group as the first job and is sequentially selected from among jobs which wait to use the second-type processor while being executed through the first-type processor provisioned by the job scheduler to a computing environment in which the first job has been generated.

13. The job scheduling method of claim 11, wherein the second job belongs to the same job switching group as the first job and is selected from among jobs, which wait to use the second-type processor while being executed through the first-type processor provisioned by the job scheduler to a computing environment in which the first job has been generated, on the basis of priorities given to the jobs; and
the priorities given to the jobs are determined on the basis of priorities given to computing environments in which the jobs have been generated.

14. The job scheduling method of claim 1, wherein the copying of the data of the region occupied by the first job in the memory of the second-type processor to the main memory comprises performing a calculation of the first job in the first-type processor; and
further comprising, after the transmitting of the instruction to execute the second job, performing processor switching between the first job and the second job when the first job executed in the first-type processor requires a calculation by the second-type processor.

15. The job scheduling method of claim 14, wherein the performing of the processor switching between the first job and the second job comprises performing processor switching between the first job and the second job even if the second job is using the second-type processor when the first job executed in the first-type processor requires a calculation by the second-type processor.

16. The job scheduling method of claim 14, wherein the performing of the processor switching between the first job and the second job comprises:
transmitting, by the first-type processor, a job suspension instruction to suspend the second job, which is currently being executed, to the second-type processor;
in response to the job suspension instruction, copying data of a region occupied by the second job in the memory of the second-type processor to the main memory;
copying the data of the first job stored in the main memory to the memory of the second-type processor; and
transmitting, by the first-type processor, an instruction to execute the first job to the second-type processor.

17. A job scheduling method performed in a computing system including a first-type processor and a second-type processor, the method comprising:
repeatedly loading jobs dequeued from a job queue into a memory of the second-type processor until no more job can be loaded;
measuring core utilization of the second-type processor;
when the measured core utilization is less than a reference value, selecting, by the first-type processor, one suspension job from among jobs currently being executed in the second-type processor and transmitting a job suspension instruction to suspend the selected suspension job to the second-type processor;
in response to the job suspension instruction, copying data of a region occupied by the selected suspension job in the memory of the second-type processor to a main memory;
copying data of a new job, which is selected from the job queue as a job constituting a job switching group together with the suspension job, to the memory of the second-type processor;
transmitting, by the first-type processor, an instruction to execute the new job to the second-type processor; and
monitoring the core utilization of the second-type processor and sequentially executing jobs belonging to the job switching group in the second-type processor every time the core utilization is less than the reference value.

18. A calculator comprising:
a main memory to which a plurality of instructions are loaded;
a first-type processor configured to execute the plurality of instructions loaded into the main memory; and
a second-type processor including a dedicated memory,
wherein the plurality of instructions include:
an instruction to measure core utilization of the second-type processor;
an instruction to transmit a job suspension instruction to suspend a first job, which is currently being executed, to the second-type processor when the measured core utilization is less than a reference value;
an instruction to copy data of a second job stored in the main memory to the memory of the second-type processor when data of a region occupied by the first job in the memory of the second-type processor is copied to the main memory in response to the job suspension instruction; and
an instruction to transmit an instruction to execute the second job to the second-type processor,
wherein the second job belongs to job switching group same as the first job; and
the job switching group is comprised of a plurality of jobs which require memory sizes of the second-type processor within a certain range allocated to the job switching group.

* * * * *